(12) United States Patent
Ishiguro

(10) Patent No.: US 8,683,383 B2
(45) Date of Patent: Mar. 25, 2014

(54) AUTOMATICALLY CULLED CROSS-MENU BAR

(75) Inventor: Satoshi Ishiguro, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 1865 days.

(21) Appl. No.: 11/928,064

(22) Filed: Oct. 30, 2007

(65) Prior Publication Data
US 2009/0113345 A1  Apr. 30, 2009

(51) Int. Cl.
*G06F 3/048* (2013.01)

(52) U.S. Cl.
USPC ............ 715/825; 715/781; 715/728; 715/729

(58) Field of Classification Search
USPC .................. 715/781, 825, 828, 829
See application file for complete search history.

(56) References Cited

U.S. PATENT DOCUMENTS

| | | | | |
|---|---|---|---|---|
| 5,367,626 | A * | 11/1994 | Morioka et al. | 715/837 |
| 5,682,486 | A * | 10/1997 | Grossman et al. | 715/788 |
| 6,377,286 | B1 * | 4/2002 | Hochmuth | 715/810 |
| 6,701,525 | B1 | 3/2004 | Neervoort et al. | |
| 7,631,274 | B2 * | 12/2009 | Kumagai et al. | 715/815 |
| 2006/0166700 | A1 * | 7/2006 | Tsai et al. | 455/557 |
| 2008/0098452 | A1 * | 4/2008 | Hardacker et al. | 725/153 |
| 2008/0235736 | A1 * | 9/2008 | Dawson et al. | 725/50 |

* cited by examiner

*Primary Examiner* — Weilun Lo
*Assistant Examiner* — Peiyong Weng
(74) *Attorney, Agent, or Firm* — Sony Corporation

(57) ABSTRACT

Unused menu items are automatically removed from a TV menu such as a cross-media bar (XMB).

7 Claims, 2 Drawing Sheets

AUTOMATICALLY CULLED CROSS-MENU BAR

I. FIELD OF THE INVENTION

The present invention relates generally to automatically culling unused icons from TV menus.

II. BACKGROUND OF THE INVENTION

TVs present menus that show various applications that can be accessed through the TVs. An application on the menu can be selected by a viewer by means of manipulating a remote control to point at and select the desired application.

As understood herein, current TV menus are static, in that the menu items, the graphic portions of which are referred to as "icons", are predefined before shipping and remain on the menu during use. As further understood herein, many viewers can consider that too many menu items appear in a TV menu because many if not most of the items will not be of interest and hence will not be selected by many viewers. As recognized herein, navigating through a TV menu that lists potentially many icons or items that the particular viewer seldom or never uses is annoying and consumes time, requiring, as it does, the viewer to mentally sort out the wheat from the chaff.

SUMMARY OF THE INVENTION

A TV system with TV tuner includes a TV display and a processor executing logic to cause a TV menu to be presented on the display. The menu lists items representative of audio video categories. An unused item is removed from the menu when the processor determines that the unused item has not been selected for at least a threshold time period.

If desired, the item can include a graphic icon. It may also include an application label. In non-limiting implementations the processor periodically determines whether a timer associated with an item indicates that a threshold period has elapsed since a most recent selection of the item, and if so, the processor increments a counter. In non-limiting embodiments the processor determines whether the counter has reached a threshold and if so, the processor removes the associated item from the menu. The menu can be a cross-media bar and the processor can be in a TV or a set box such as but not limited to a set-back box or set-top box.

In another aspect, a TV has a display and a processor presenting a menu on the display. The menu contains icons representing entertainment content categories. The menu is dynamically updated by the processor to reflect the non-use of at least one icon.

In another aspect, a method includes displaying a menu on a TV display, with the menu listing categories of entertainment available for presentation on the TV. The method also includes providing category selection information to the TV. The information includes a time period since at least one category on the menu was selected. Based on the time period, the category is selectively removed from the menu.

The details of the present invention, both as to its stricture and operation, can best be understood in reference to the accompanying drawings, in which like reference numerals refer to like parts, and in which:

DETAILED DESCRIPTION OF THE PREFERRED EMBODIMENT

Figure 1:
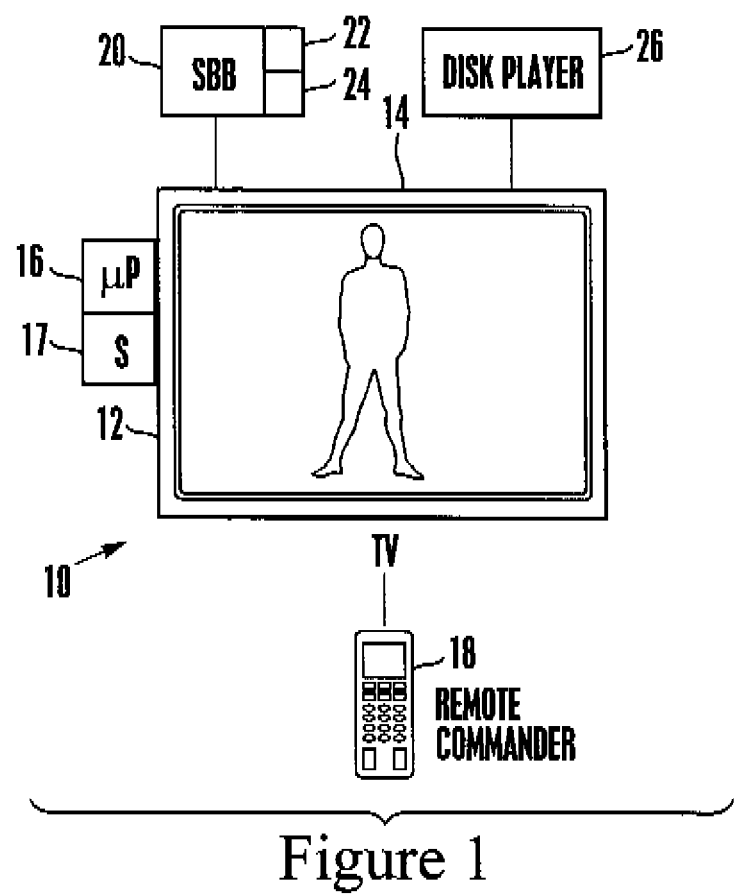
FIG. 1 is a block diagram of a non-limiting TV system in accordance with present principles.

Referring initially to FIG. 1, a system is shown, generally designated 10, which includes a TV 12 having a TV display 14 and a TV processor 16. The processor 16 can access a computer-readable medium 17 such as optical or hard disk storage or solid state storage to execute logic contained in the medium 17 and discussed in relation to the flow charts herein. A viewer can control the TV 12 by means of manipulating a wireless remote control 18.

FIG. 1 shows that one or more components may communicate with the TV 12. By way of non-limiting example, a set-back box (SBB) 20 can communicate with the TV 12 using both high definition multimedia interface (HDMI) principles and universal serial bus (USB) communication principles as shown. The SBB 20 may include a SBB processor 22 that can access a computer-readable medium 24 such as disk storage or solid state storage to execute logic contained in the medium 24, it being understood that the logic reflected in the flow charts may alternatively be executed by the SBB. The medium 24 can also contain one or more software applications, each providing its own source of entertainment for display on the TV 12. In one implementation the SBB is made by Sony and accesses the Internet to provide Internet video to the TV for display. One or both of the TV and SBB incorporate a TV tuner.

Additional non-limiting examples of components that can be connected to the TV 12 include a disk player 26 such as hut not limited to a DVD player or BluRay player, which can also have its own internal processor.

Figure 2:
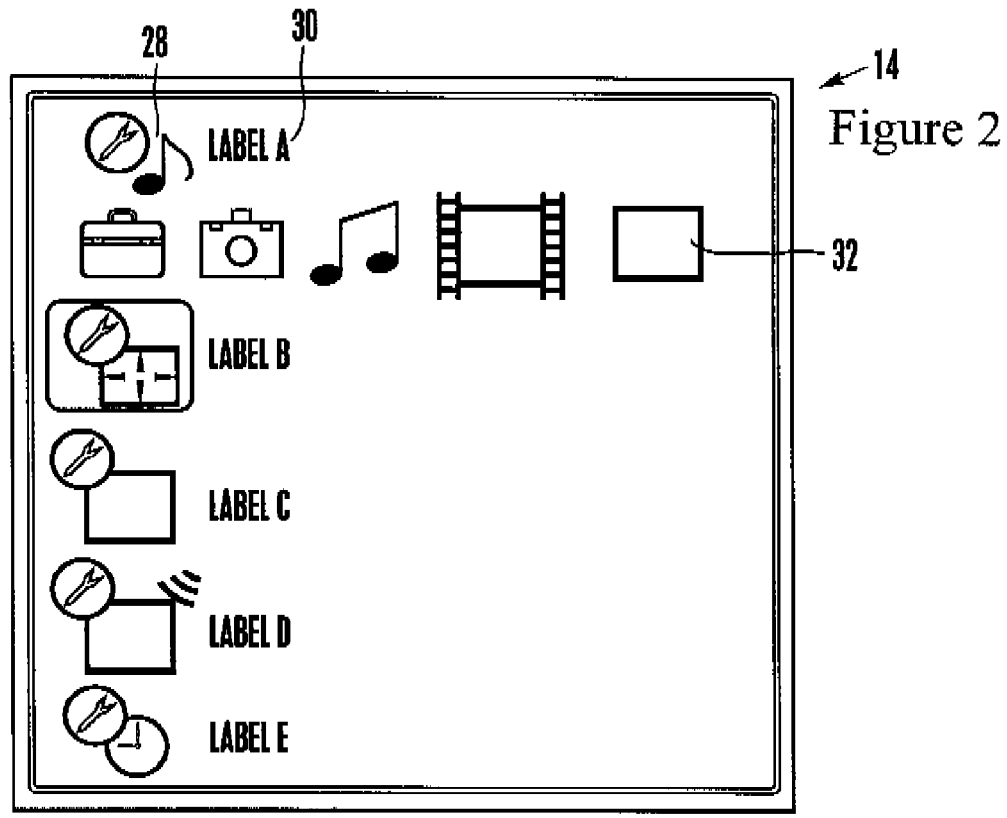
FIG. 2 is a non-limiting example of a dynamically culled TV menu implemented as a cross-media bar ("XMB") that can be presented on the TV.

FIG. 2 shows a non-limiting implementation of a menu that can be presented on the TV display 14. The implementation shown in FIG. 2 is colloquially referred to as a "cross media bar" or "XMB". As shown, plural icons 28 are presented in an ordered list, with associated alpha-numeric application labels 30 presented next to at least some of the icons 28 as shown. Together, an icon with label (or lone icon without label) may be thought of as a menu item. In FIG. 2, five top-level menu items labelled A-E are shown. The icons 28 may be audio video category icons, indicating, e.g., "video", "music", etc., and sub-icons 32 representing applications within a category (such as the name of a movie on a disk in the disk player 26, which would appear to the right of the "video" icon) can be arranged in a row with the category icon 28 in the left-hand end of the row. Other icon arrangements and layouts can be used. A viewer may manipulate the remote commander 18 to select an item on the menu as a means to control the presentation of the TV. For example, when the "video" icon is selected and then a sub-menu of available videos is presented, the viewer may select a desired video to cause it to be displayed on the TV. The video may be from a video disk in the player 26 or from the Internet view the SBB 20 or from another appropriate source.

Figure 3:
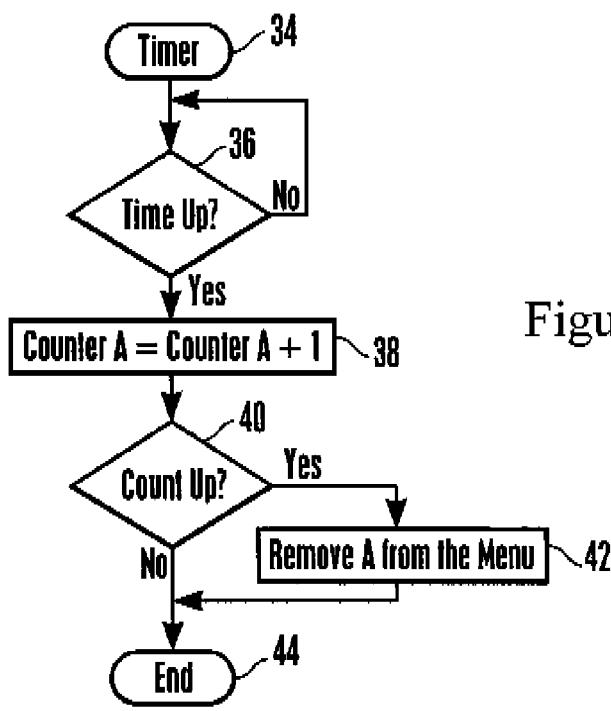
FIG. 3 is a flow chart of non-limiting logic for culling the TV menu.

FIG. 3 shows an example non-limiting implementation of the present logic for automatically removing items from the TV menu shown in FIG. 2. It is to be understood that for clarity FIG. 3 assumes only one menu item for test, it being understood that the logic of FIG. 3 can be extended as appropriate for the actual number of menu items on the particular TV menu being used.

Commencing with a time state 34, the logic proceeds to decision diamond 36 to determine whether an increment time period has elapsed since the last selection of the menu item under test. If it has, the counter associated with the menu item (referred to as item "A") is incremented by one, and if the new value of the counter is determined at decision diamond 40 to meet a threshold, the menu item "A" is removed at block 42 from the menu shown in FIG. 2. Each menu item is tested similarly, with its counter being incremented when a time period associated with the menu item has elapsed since the last selection of the menu item. The thresholds may vary from menu item to menu item if desired. The logic of FIG. 3 ends at state 44.

Figure 4:
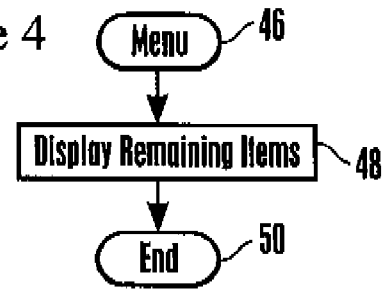
FIG. 4 is a flow chart of logic for presenting a culled TV menu.

When a "display menu" command subsequently is received at state 46 of FIG. 4, the items remaining on the menu after the logic of FIG. 3 has been executed for each item are displayed at block 48 in, e.g. the format of FIG. 2. The logic of FIG. 4 ends at state 50.

Figure 5:
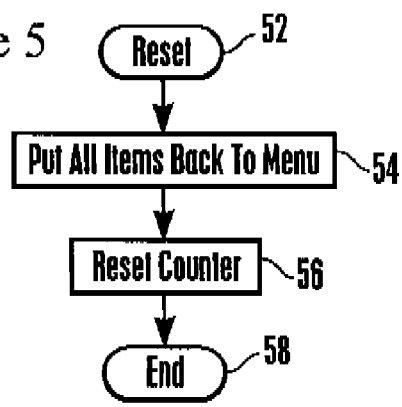
FIG. 5 is a flow chart for resetting the menu.

FIG. 5 shows that if desired, the user may be afforded the opportunity to input a "menu reset" command at state 52 using, e.g., a user interface button on a main TV menu and selecting the button using, e.g., the remote commander 18. In response, all menu items that had been removed as the result of FIG. 3 are put back onto the menu at block 54. The counter(s) of the previously removed and now-replaced menu items are reset at block 56, and the logic ends at state 58.

While the particular AUTOMATICALLY CULLED CROSS-MENU BAR is herein shown and described in detail, it is to be understood that the subject matter which is encompassed by the present invention is limited only by the claims.

What is claimed is:

1. A television (TV) system with TV tuner and comprising:
   a TV display; and
   a processor executing logic to cause a TV cross-media bar menu to be presented on the display, the menu listing items representative at least of audio video categories,
   the processor removes a first item from the menu when the processor determines that the first item has not been selected for at least a first threshold time period, the first threshold time period being used to test the first item on the menu and a second threshold time period being used to test a second item on the menu, the first threshold time period being different from the second threshold time period; and
   responsive to a "menu reset" command input using a user interface selector element presented on the TV display, the processor replaces onto the menu the first item that had been removed and resetting the first threshold time period associated with the first item.

2. The system of claim 1, wherein the item includes a graphic icon.

3. The system of claim 2, wherein the item includes an application label.

4. The system of claim 1, wherein the processor periodically determines whether a timer associated with an item indicates that a threshold period has elapsed since a most recent selection of the item, and if so, the processor increments a counter.

5. The system of claim 4, wherein the processor determines whether the counter has reached a threshold and if so, the processor removes the associated item from the menu.

6. The system of claim 1, wherein the processor is in a TV.

7. The system of claim 1, wherein the processor is in a set box.

\* \* \* \* \*